(12) United States Patent
Ogawa et al.

(10) Patent No.: US 7,912,054 B2
(45) Date of Patent: Mar. 22, 2011

(54) METHOD AND APPARATUS FOR MULTICAST PACKET READOUT CONTROL

(75) Inventors: Masayuki Ogawa, Yokohama (JP); Kenji Miura, Yokohama (JP); Tamotsu Matsuo, Yokohama (JP); Hiroshi Urano, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 506 days.

(21) Appl. No.: 11/024,367

(22) Filed: Dec. 28, 2004

(65) Prior Publication Data

US 2005/0207417 A1 Sep. 22, 2005

(30) Foreign Application Priority Data

Mar. 19, 2004 (JP) .................................. 2004-079765

(51) Int. Cl.
*H04L 12/28* (2006.01)
(52) U.S. Cl. ........ 370/390; 370/229; 370/389; 370/392; 370/412; 370/414
(58) Field of Classification Search .................. 370/229, 370/388, 389, 390, 392, 295, 412, 414, 416, 370/429, 415
See application file for complete search history.

(56) References Cited

U.S. PATENT DOCUMENTS

| | | | | |
|---|---|---|---|---|
| 5,577,035 A * | 11/1996 | Hayter et al. | ............. | 370/395.4 |
| 5,617,421 A * | 4/1997 | Chin et al. | .................. | 370/402 |
| 5,689,505 A * | 11/1997 | Chiussi et al. | ............... | 370/388 |
| 5,825,767 A * | 10/1998 | Mizukoshi et al. | ........ | 370/395.7 |
| 5,898,687 A * | 4/1999 | Harriman et al. | ............. | 370/390 |
| 5,909,438 A | 6/1999 | Melden et al. | | |
| 6,049,546 A * | 4/2000 | Ramakrishnan | .............. | 370/412 |
| 6,212,182 B1 * | 4/2001 | McKeown | .................... | 370/390 |
| 6,320,864 B1 * | 11/2001 | Hebb et al. | .................... | 370/412 |
| 6,349,097 B1 * | 2/2002 | Smith | .......................... | 370/390 |
| 6,560,237 B1 * | 5/2003 | Hiscock et al. | ............... | 370/412 |
| 6,636,510 B1 * | 10/2003 | Lee et al. | .................... | 370/390 |
| 6,721,319 B1 * | 4/2004 | Amano et al. | ................. | 370/390 |
| 6,765,867 B2 * | 7/2004 | Shanley et al. | ............... | 370/229 |
| 6,798,773 B2 * | 9/2004 | Trossen et al. | ................ | 370/390 |
| 6,870,840 B1 * | 3/2005 | Hill et al. | ..................... | 370/389 |
| 6,873,627 B1 * | 3/2005 | Miller et al. | .................. | 370/466 |
| 6,895,006 B1 * | 5/2005 | Tasaki et al. | .................. | 370/390 |
| 6,931,014 B2 * | 8/2005 | Lee | ......................... | 370/395.42 |

(Continued)

FOREIGN PATENT DOCUMENTS

JP 2000503194 3/2000

(Continued)

OTHER PUBLICATIONS

Japanese Office Action dated Jun. 2, 2009, and a partial English-language translation thereof, from the corresponding Japanese Patent Application No. 2004-079765.

*Primary Examiner* — Salman Ahmed
*Assistant Examiner* — Andrew C Lee
(74) *Attorney, Agent, or Firm* — Katten Muchin Rosenman LLP

(57) ABSTRACT

A multicast packet readout control method is disclosed. An input multicast packet is temporarily stored in a multicast queue of a packet buffer. The multicast packet is read from the multicast queue, and converted into a unicast packet addressed to each of the destinations of the multicast packet. The converted unicast packet is stored in a unicast queue of the packet buffer. The converted unicast packet is then read from the unicast queue and transmitted to the destination.

11 Claims, 12 Drawing Sheets

U.S. PATENT DOCUMENTS

| | | | |
|---|---|---|---|
| 6,934,289 B2* | 8/2005 | Lee | 370/395.1 |
| 6,947,413 B2* | 9/2005 | Wakabayashi et al. | 370/358 |
| 6,956,859 B2* | 10/2005 | Davis | 370/397 |
| 6,957,277 B2* | 10/2005 | Yagyu et al. | 709/245 |
| 6,963,563 B1* | 11/2005 | Wong et al. | 370/389 |
| 7,016,349 B1* | 3/2006 | Raza et al. | 370/390 |
| 7,110,405 B2* | 9/2006 | Divivier | 370/390 |
| 7,158,528 B2* | 1/2007 | Dell et al. | 370/416 |
| 7,184,443 B2* | 2/2007 | Bonomi et al. | 370/414 |
| 7,187,675 B2* | 3/2007 | Henrion | 370/390 |
| 7,281,058 B1* | 10/2007 | Shepherd et al. | 709/238 |
| 7,310,346 B2* | 12/2007 | Shimonishi | 370/412 |
| 7,561,570 B2* | 7/2009 | Kondo | 370/392 |
| 2001/0026556 A1* | 10/2001 | Yagyu et al. | 370/432 |
| 2002/0031092 A1* | 3/2002 | Wakabayashi et al. | 370/249 |
| 2002/0075871 A1* | 6/2002 | Blanc et al. | 370/390 |
| 2002/0131412 A1* | 9/2002 | Shah et al. | 370/390 |
| 2002/0131419 A1* | 9/2002 | Tamai | 370/395.4 |
| 2002/0143951 A1* | 10/2002 | Khan et al. | 709/227 |
| 2003/0053470 A1* | 3/2003 | Divivier | 370/412 |
| 2003/0076827 A1* | 4/2003 | Henrion | 370/390 |
| 2003/0076828 A1* | 4/2003 | Henrion | 370/390 |
| 2003/0231588 A1* | 12/2003 | Roth et al. | 370/230 |
| 2004/0068583 A1* | 4/2004 | Monroe et al. | 709/246 |
| 2004/0114616 A1* | 6/2004 | Wang | 370/412 |
| 2004/0202163 A1* | 10/2004 | Lee | 370/390 |
| 2005/0002395 A1* | 1/2005 | Kondo | 370/390 |
| 2005/0036502 A1* | 2/2005 | Blanc et al. | 370/412 |
| 2005/0068798 A1* | 3/2005 | Lee et al. | 365/49 |
| 2008/0267183 A1* | 10/2008 | Arndt et al. | 370/390 |

FOREIGN PATENT DOCUMENTS

| | | |
|---|---|---|
| JP | 2000-295256 | 10/2000 |
| JP | 2000295256 | 10/2000 |
| JP | 2002077168 | 3/2002 |

* cited by examiner

MULTICAST PACKET FORMAT

DOMAIN GROUP TABLE

METHOD AND APPARATUS FOR MULTICAST PACKET READOUT CONTROL

BACKGROUND OF THE INVENTION

1. Field of the Invention

The present invention generally relates to a method and an apparatus for multicast packet readout control, and more particularly, to a technique for reading and transmitting packets from a packet buffer, while performing QoS (Quality of Service) processing (including bandwidth control and priority routing control), in a layer 2 switch in IP (Internet Protocol) network. The packet buffer temporarily stores packets, such as Ether (registered trademark) frames, for each destination.

2. Description of the Related Art

A unicast packet addressed to a single destination is read from a packet buffer and transmitted to the destination. For a multicast packet with multiple destinations, the packet read from the packet buffer has to be copied as many as the number of destinations so as to be transmitted to each of the destinations.

To identify the destinations of a multicast packet, a destination bitmap is used, in which each destination is represented by one bit. The number of bits used in the destination bitmap agrees with the acceptable maximum number of destination in the multicasting scheme. The destination bitmap is managed under the domain ID, and each domain is associated with the corresponding destination bitmap in a table. This table is referred to as a domain group table.

When transmitting a multicast packet, the domain ID attached to the multicast packet is used as the address for accessing the domain group table. The destination bitmap managed under this domain ID is acquired from the table. The multicast packet is then copied and transmitted to all the destinations indicated by the bit positions of "1" in the bitmap.

FIG. 1A and FIG. 1B illustrate a multicast packet format and the structure of a domain group table, respectively. As illustrated in FIG. 1A, a domain ID is prepended to the multicast packet. Based on this domain ID, the domain group table shown in FIG. 1B is read, and the destination bitmap is acquired. The multicast address is transmitted to those destinations indicated by the entries with a bit "1" set in the destination bitmap. In the example shown in FIG. 1A, 256 destinations are recorded in each bitmap in the table.

FIG. 2 is a functional block diagram of the conventional multicast packet readout control apparatus, and FIG. 3 is a time chart of the multicast packet readout control apparatus. The multicast packet readout control apparatus includes a scheduler 10, a packet buffer controller 20, a multicast temporary buffer 50, a bandwidth control table 60, and blocks A, B, and C (which are structured as programmable LSI circuits, such as FPGAs). The control apparatus also includes a packet buffer 30 and a domain group table 40, which are implemented as memories connected externally to the main body of the control apparatus.

The conventional multicast packet readout control procedure is described below. The parenthesized numerical symbols inserted in FIG. 2 and FIG. 3 correspond to the step numbers described below.

(1) The packet buffer controller 20 writes the input multicast packet in packet buffer 30.
(2) Th packet buffer controller 20 informs to the scheduler 10 that the multicast packet has been written in the packet buffer 30 (occupied or non-empty state).
(3) The scheduler 10 supplies a multicast packet reading request to the packet buffer controller 20.
(4) The packet buffer controller 20 reads the header of the multicast packet from the packet buffer 30.
(5) The packet buffer controller 20 controls block A so as to access the associated domain group table 40 based on the domain ID information written in the header of the multicast packet.
(6) Block A acquires the multicast destination bitmap from the domain group table 40, and transmit the multicast destination bitmap to the scheduler 10.
(7) The scheduler 10 selects a destination to which output bandwidth is allocated from among those destinations with a bit "1" in the multicast destination bitmap, and supplies a multicast packet readout request to the packet buffer controller 20.
(8) The packet buffer controller 20 reads the header and the data portion of the multicast packet from the packet buffer 30.
(9) The packet buffer controller 20 sends the multicast packet read from the packet buffer 30 to the destination selected in step (7) via block B, and simultaneously, stores this multicast packet in the multicast temporary buffer 50.
(10) The packet buffer controller 20 supplies a readout completion notice, which indicates that the reading of the multicast packet from the packet buffer 30 has been completed, to the scheduler 10.
(11) The scheduler 10 selects the next destination to which output bandwidth is allocated from those destinations with a bit "1" in the multicast destination bitmap, and instructs block B to read the multicast packet from the multicast temporary buffer 50.
(12) Block B reads the multicast packet from the multicast temporary buffer 50 and transmits the multicast packet to the destination selected in step (11).
(13) Block B reads the multicast packet from the multicast temporary buffer 50 at an interval of unicast packet readout periods for reading unicast packets from the packet buffer 30.
(14) Subsequently, the above-described steps (11) through (13) are repeated for the remaining destinations with a bit "1" until the multicast packet is transmitted to all the destinations set in the multicast destination bitmap. When the transmission of the multicast packet to all the destinations is completed, the next multicast packet stored in the packet buffer 30 is transmitted to the destinations by performing the above-described procedure.

FIG. 3 is a time chart showing the above-described procedure along the time axes. In FIG. 3, a1, b1, c1, a2, b2, and c2 denote unicast packets, mc1 and mc2 denote multicast packets, and m denotes the header portion of the multicast packet mc1. Symbol A denotes the destination ports of packets a1 and a2, B denotes the destination ports of packets b1 and b2, C denotes the destination ports of packets c1 and c2.

FIG. 4 is a functional block diagram illustrating a conventional multicast packet readout control. In FIG. 4, the multicast destination bitmap 11 is acquired from the domain group table 40. The bandwidth allocation table 16 is installed through software processing, which table records bandwidths of users allocated by contract. The bandwidth control unit 13 periodically adds the bandwidth set in the bandwidth allocation table 16 to the bandwidth of each user. When the packet is output to the destination, the amount of packet is subtracted from the bandwidth. If the subtraction result is positive, the next packet can be output.

In the empty flag setting unit 12 is set a flag indicating whether packets are delayed in the packet buffer 30. The flag is set for each of the destination ports. The readout queue selector 15 selects a destination from those destinations that exhibit positive values of bandwidth and have flags indicating the non-empty state (that is, the accumulation of packets in the packet buffer 30), and informs the selected queue to the readout address generator 21. The readout address generator 21 generates a packet readout address indicating the address in the packet buffer 30, from which the packet is to be read out.

The readout queue selector 15 determines whether a unicast packet or a multicast packet is to be transmitted to the selected destination. According to the determination result, the readout queue selector 15 controls the selector 70 so as to output either one of the unicast packet from the packet buffer 30 and the multicast packet from the multicast temporary buffer 50.

To read and transmit packets from the packet buffer 30 or the multicast temporary buffer 50, the following conditions have to be satisfied.

Output bandwidth has been allocated to the destination port under bandwidth control; and The empty flag indicates the non-empty state (with packets accumulated in the packet buffer 30), or the entry of the muticast destination bitmap is still set to "1" because of existence of multicast packets in the multicast temporary buffer 50.

The readout queue selector 15 selects a destination from those destinations that meet with the conditions, and reads the packet from the packet buffer 30 or the multicast temporary buffer 50. Concerning multicast packets, they are reads from the packet buffer 30, and stored temporarily in the multicast temporary buffer 50. If the above-described conditions are satisfied, multicast packets are read and transmitted from the multicast temporary buffer 50.

The multicast packet stored in the multicast temporary buffer 50 is copied and transmitted to all the destinations with a bit "1" set in the multicast destination bitmap 11. After the multicast packet has been copied and transmitted to all the destinations, the next multicast packet is read from the packet buffer 30, stored in the multicast temporary buffer 50, and transmitted to the destinations through the same process.

If there is any single destination to which port output bandwidth has not been allocated among those destinations with a bit "1" in the multicast destination bitmap 11, the transmission process of this multicast packet is not completed, and therefore, the next multicast packet cannot be output.

To overcome this problem, the scheduler 10 is furnished with a discard timer 14. If copies of the multicast packet are not transmitted to all the destinations within a prescribed time period, the multicast packet is discarded so as to allow the next multicast packet to be read form the packet buffer 30 and subjected to the transmission process.

With the conventional multicast packet readout control, class priority judgment or strict priority control (SP control) affects the multicast packet readout operation. Explanation is made of the influence below. Based on the acquired destination bitmap information, the scheduler 10 supplies a multicast packet readout request to the packet buffer controller 20 or the multicast temporary buffer 50 (in above-described steps (7) or (11)). At this time, the scheduler 10 performs request acceptability judgment, as follows:

Determination as to availability of allocatable output bandwidth under bandwidth control (through periodical addition of bandwidth using a token and subtraction of bandwidth during the packet reading operation);

Determination of the empty flag value (indicating whether there are packets accumulated in the packet buffer 30); and Logical determination for selection of readout available queue (selection of destination port by weighted round-robin control and class priority (SP) judgment).

In class priority (SP) judgment, class with higher priority is selected from the selectable packets. Priority classes include the followings, which are listed from the higher order.

[1] unicast highest priority class (Uni-H Class)
[2] Unicast high priority class (Uni-M Class)
[3] Multicast high priority class (Mul-H Class)
[4] Unicast low priority class (Uni-L Class)
[5] Multicast low priority class (Mul-L Class)

It should be noted that the class priority (SP) judgment is closed in each destination port.

Actual example of influence of class priority (SP) judgment on multipacket readout control is explained with reference to FIG. 5. It is assumed that, in the request acceptability determination performed by the scheduler 10, output bandwidth is allocated sufficiently to all the destination ports (ports A, B, and C in FIG. 5). It is also assumed that, concerning determination as to the presence of packets, high-priority class multicast packets (PACKET i and PACKET ii in Mul-H class) are accumulated in packet buffer 30, designating destination ports A, B, and C. It is further assumed that a large number of unicast packets of highest priority class (Uni-H class) have been input to a certain port (for example, Port A) among the designated designation ports A, B, and C.

Under these circumstances, multicast packet readout control is performed as follows. The step numbers below correspond to the parenthesized numerical symbols shown in FIG. 2 and FIG. 3.

(1) Multicast packets (PACKET i and subsequent PACKET ii) are stored in packet buffer 30. At this time, unicast packets of the highest priority class for destination port A are also stored in packet buffer 30.

(2) The scheduler 10 is informed of the writing of multicast packet (PACKET i) in the packet buffer 30.

(3) The scheduler 10 supplies a multicast readout request to the packet buffer controller 20.

(4) The packet buffer controller 20 reads the header of the multicast packet (PACKET i) from the packet buffer 30.

(5) The associated multicast destination bitmap for PACKET i is read from the domain group table 40 based on the domain ID information written in the header.

(6) The multicast destination bitmap acquired from the domain group table 40 is transmitted to the scheduler 10.

(7) The scheduler 10 selects a multicast packet (for example, PACKET i) with a bit "1" set in the multicast destination bitmap designating a destination port (A, B, or C) to which output bandwidth is allocated, or a unicast packet of the highest priority class at destination port A, based on the weighed round-robin method and class priority (SP) judgment. For example, the scheduler 10 supplies a readout request for the unicast packet of highest priority class at destination port A to the packet buffer controller 20 to allow the unicast packet to be read and transmitted to the destination. Then, the scheduler 10 outputs a readout request for the multicast packet for destination port B for transmission of this multicast packet, and deletes "1" from port B in the destination bitmap. The remaining destinations of the multicast packet are those defined by destination ports A and C.

(8) The packet buffer controller 20 reads the header and the data portion of the multicast packet (PACKET i) from the packet buffer 30.

(9) The multicast packet (PACKET i) read from the packet buffer 30 is output to the destination port B determined in step (7), and at the same time, stored in the multicast temporary buffer 50.
(10) The packet buffer controller 20 supplies a readout completion notice, indicating that the reading of the multicast packet (PACKET i) from the packet buffer 30 has been completed, to the scheduler 10.
(11) The scheduler 10 selects a multicast packet (for example, PACKET i) with a bit "1" set in the multicast destination bitmap for a remaining port (A or C) to which output bandwidth is allocated, or a unicast packet of the highest priority class at destination port A, based on the weighed round-robin method and class priority (SP) judgment. For example, the scheduler 10 outputs a readout request for the multicast packet for destination port C to the multicast temporary buffer 50, and deletes "1" from port C in the destination bitmap after the transmission of this multicast packet. The remaining destination of the multicast packet is that defined by destination ports A.
(12) The multicast packet (PACKET i) read from the multicast temporary buffer 50 is output to the destination port C selected in step (11).
(13) After the multicast packet (PACKET i) has been transmitted, a transmission completion notice is supplied to the scheduler 10.
(14) Subsequently, the above-described steps (11) through (13) are repeated for the remaining destinations with a bit "1" until the multicast packet (PACKET i) is transmitted to all the destinations set in the multicast destination bitmap. It should be noted that if destination port A that stores the highest-priority unicast packets (determined by SP control) still remains in the remaining destination, then priority is given to the readout of this unicast packet at destination port A, while withholding transmission of a multicast packet from the destination port A.

With this conventional arrangement, the readout queue selector 15 does not select a multicast packet of high priority class (Mul-H class) for destination port A until there is no unicast packet of the highest priority class (Uni-H class) given the highest priority by the class priority (SP) judgment left at destination port A. At destination ports B and C, multicast packets are selectable, and therefore, a multicast packet is selected by weighted round-robin.

Under this configuration, multicast packet readout requests for destination ports B and C are supplied to the multicast temporary buffer 50; however, the request for destination port A is not supplied to the temporary buffer 50. Accordingly, transmission of the multicast packet (PACKET i) is not completed within the prescribed time period set by the discard timer 14. The multicast packet (PACKET i) is discarded, causing undesirable packet loss.

It takes long time for the conventional multicast packet readout control method to transmit copies of the multicast packet stored in the multicast temporary buffer 50 to all the destinations if there is a destination with insufficient output bandwidth allocated among those destinations with a bit "1" set in the multicast destination bitmap.

Because the next multicast packet (PACKET ii) cannot be read from packet buffer 30 promptly, the subsequent multicast packets are being accumulated in the packet buffer 30. In spite of the fact that other destination ports are available, the next multicast packet (PACKET ii) cannot be transmitted to the destinations from said other ports. This causes serious delay due to blocking of multicast packets.

Blocking of multicast packets is caused by not only the existence of a destination with insufficient output bandwidth allocated, but also class priority (SP) control. In addition, with the conventional technique, packet loss occurs because the multicast packets delayed for a prescribed time period are discarded using a discard timer in order to start the readout process for the next multicast packet.

JP 2000-295256A discloses a technique for unicasting an APR (Address Resolution Protocol) request, which is generally transmitted by broadcasting, to reduce the network traffic. This technique is not addressed to readout control of multicast packets.

SUMMARY OF THE INVENTION

The present invention was conceived to overcome the above-described problems in the prior art, and it is an object of the present invention to provide a multicast packet readout control technique that enables the next multicast packet to be transmitted promptly from available destination ports even if a previous multicast packet remains long time in the buffer under bandwidth control and class priority control.

To achieve the object, in one aspect of the invention, a multicast packet readout control method is provided. This method includes the steps of:
1. A multicast packet readout control method comprising the steps of:
 (a) temporarily storing an input multicast packet in a multicast queue of a packet buffer;
 (b) reading the multicast packet from the multicast queue;
 (c) converting the multicast packet to a unicast packet addressed to each of destinations of the multicast packet;
 (d) storing the converted unicast packet in a unicast queue of the packet buffer; and
 (e) reading the converted unicast packet from the unicast queue and transmitting the unicast packet to the destination.

In another aspect of the invention, a multicast packet readout control apparatus is provided. The apparatus comprises:
 (a) a packet buffer configured to temporarily store an input multicast packet in a multicast queue;
 (b) packet conversion means configured to read the multicast packet from the multicast queue and convert the multicast packet to a unicast packet addressed to each of destinations of the multicast packet, the converted unicast packet being stored in a unicast queue of the packet buffer; and
 (c) reading and transmitting means configured to read the converted unicast packet from the unicast queue and transmit the converted unicast packet to the destination.

In an preferred example, the apparatus may further includes:
 a primary signal queue buffer configured to store the input multicast packet of a primary signal before the input multicast packet is stored in the packet buffer;
 a multicast temporary buffer configured to store the multicast packet read from the multicast queue; and
 a selector configured to output either one of the multicast packet from the multicast temporary buffer and the input multicast packet of the primary signal from the primary signal queue buffer.

In this case, the multicast packet output from the multicast temporary buffer is converted to a unicast addressed to each of the destinations of the multicast packet.

BRIEF DESCRIPTION OF THE DRAWINGS

Other objects, features, and advantages of the present invention will become more apparent from the following detailed description when read in conjunction with the accompanying drawings, in which.

DETAILED DESCRIPTION OF THE PREFERED EMBODIMENTS

The preferred embodiments of the present invention are now described below with reference to the attached drawings.

Figure 4:
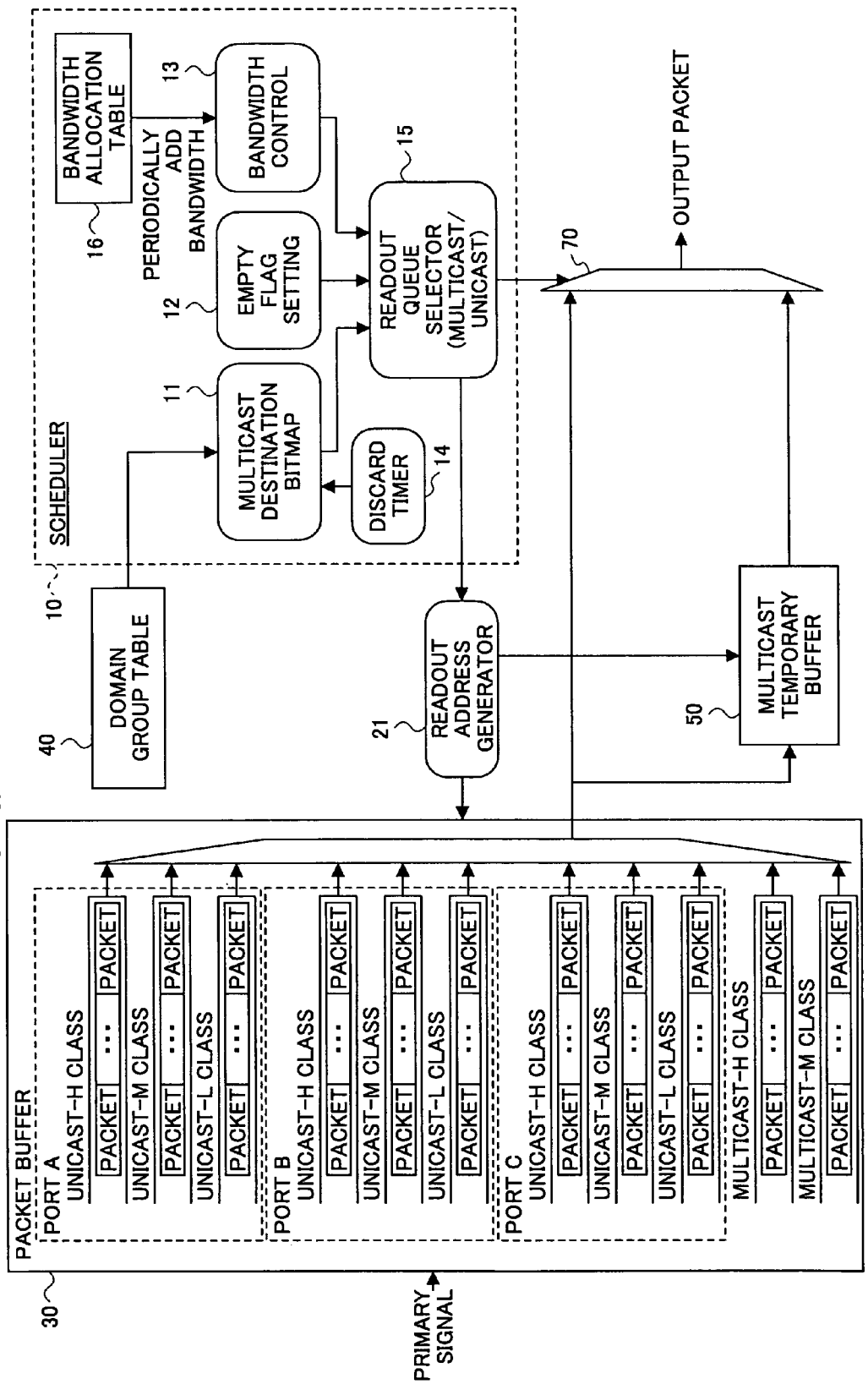
FIG. 4 is a functional block diagram illustrating the detailed structure of the conventional multicast packet readout control.
Figure 5:
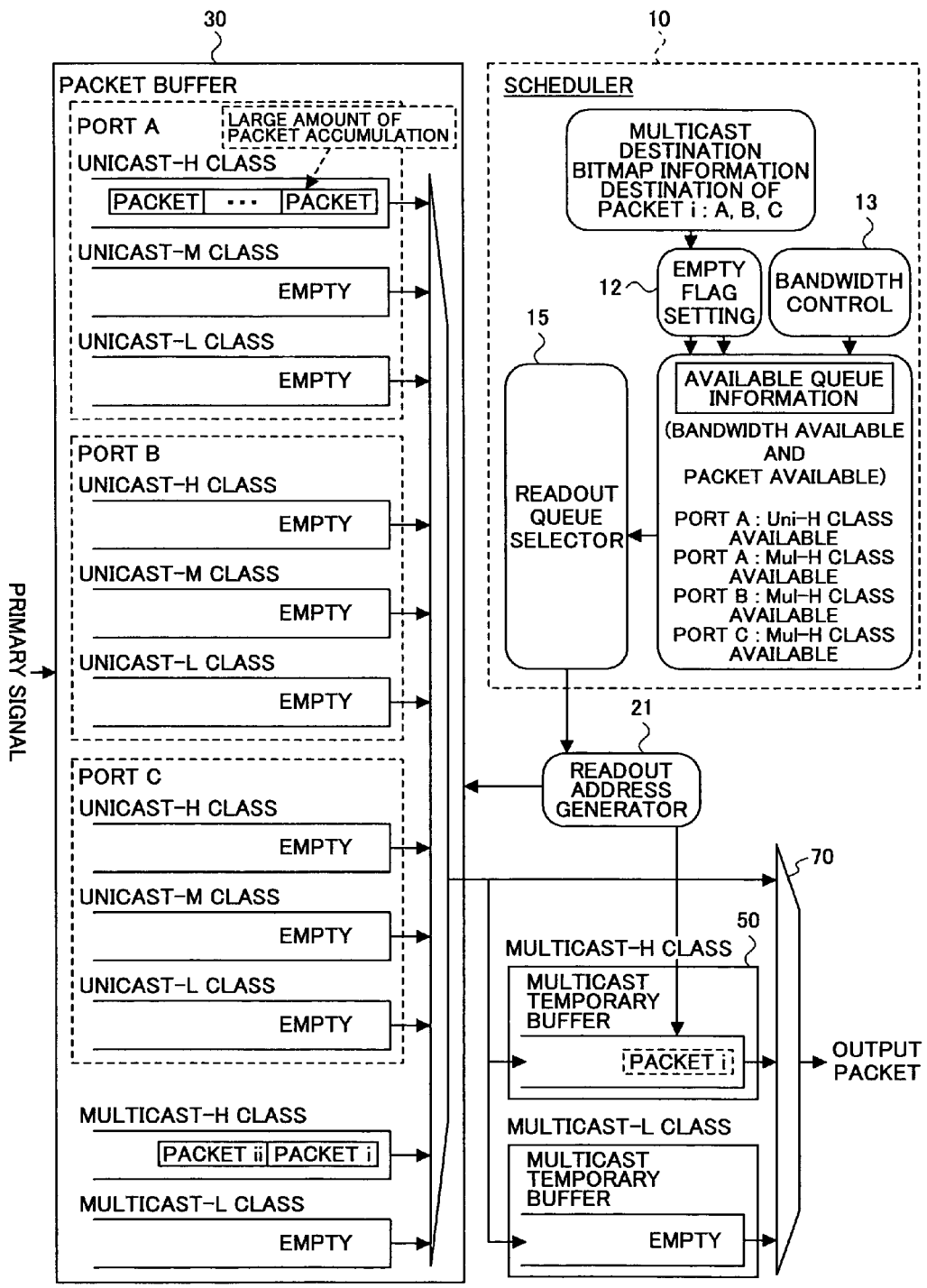
FIG. 5 is a diagram used to explain influence of multipacket readout control under class priority judging (SP) control.
Figure 6:
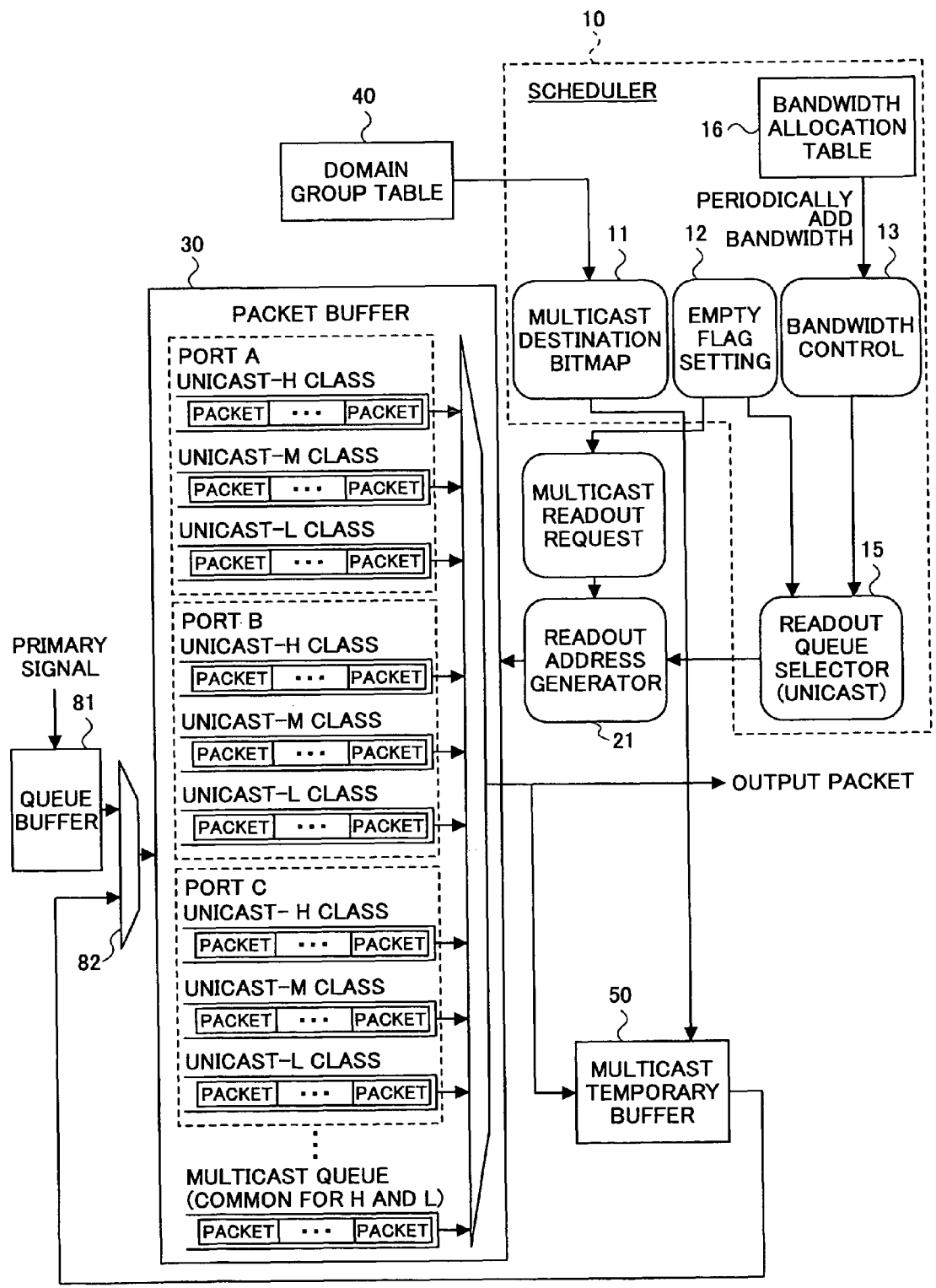
FIG. 6 is a functional block diagram of a multicast packet readout control apparatus according to an embodiment of the invention.

FIG. 6 is a functional block diagram illustrating the configuration of multicast packet readout control according to an embodiment of the invention. The same components as those of the conventional structure shown in FIG. 4 are denoted by the same numerical references, and explanation for them is omitted. Explanation is made below with a focus on the difference from the conventional art. The queue structure of the packet buffer 30 shown in both FIG. 4 and FIG. 6 is based on the priority classes.

The first difference between the present invention and the conventional art is the output route of a multicast packet read from the multicast temporary buffer 50. In the conventional technique, the multicast packet read from the multicast temporary buffer 50 is output via a selector 70 to the destination. In contrast, in an embodiment of the present invention, the multicast packet output from the multicast temporary buffer 50 is written as a unicast packet in a unicast queue of the packet buffer 30 at the associated address.

The packet buffer 30 receives either a primary signal input packet temporarily accumulated in a queue buffer 81, or a unicast packet converted from a multicast packet and supplied from the multicast temporary buffer 50, via a selector 82. Conversion from a multicast packet to a unicast packet is carried out by converting the multicast address written in the header portion of the packet into an address determined by the domain ID and the position of bit "1" set in the destination bitmap.

The second difference is that the multicast packet readout control of the present invention does not require discarding multicast packet using the discard timer 14. In the embodiment of the present invention, a multicast packet is read in the time gap between unicast packet reading period, regardless of the availability or sufficiency of output bandwidth. The multicast packet is then converted to a unicast packet for each of the destinations and written in the packet buffer 30. Since this arrangement allows a multicast packet to be copied and written in the associated destination queues in a short time, the discard timer used in the conventional technique to perform discarding process is not required.

The third difference is the number and the type of queues managed by the scheduler 10. In the conventional technique, scheduling is conducted for both multicast queues and unicast queues, and a queue suitable for packet readout is selected from the mixture of these queues. In contrast, in the embodiment of the invention, all the multicast packets are converted into unicast packets, and the scheduler 10 manages only unicast queues. The processing workload is greatly reduced.

Next, explanation is made of class priority judging (SP) control and the influence on the multicast packet readout operation. Under the class priority judging (SP) control, a packet of a higher priority class is selected from the available packets according to the ordering of priority. In the present invention, the scheduler 10 manages solely the priority of unicast packet classes because all the multicast packets are converted to unicast packets. In the embodiment, three priority classes listed below are managed by the scheduler 10.

[1] Unicast highest priority class (Uni-H Class);
[2] Unicast high priority class (Uni-M Class; and
[3] Unicast Low Priority Class (Uni-L Class).

Multicast packets of the conventional high-priority class (Mul-H class) are stored in queue of unicast high priority class (Uni-H class) in the packet buffer 30 after conversion to unicast packets. Multicast packets of conventional low priority class (Mul-L class) are stored in queue of unicast low priority class (Uni-L class) in the packet buffer 30 after conversion to unicast packets. Accordingly, the scheduler 10 has only to manage three types of unicast packet priority classes.

Determination of multicast packet readout request acceptability carried out by the scheduler 10 includes the following conditions, as in the conventional technique.

Determination as to availability of allocatable output bandwidth under bandwidth control (through periodical addition of bandwidth using a token and subtraction of bandwidth during the packet reading operation);

Determination of the empty flag value (indicating whether there are packets accumulated in the packet buffer 30); and Logical determination for selection of readout available queue (selection of destination port by weighted round-robin control and class priority (SP) judgment).

Next, an actual example of the multicast packet readout control operation is explained with reference to the time chart shown in FIG. 7 and the detailed functional block diagram shown in FIG. 8. It is assumed that, in the request acceptability determination performed by the scheduler 10, output bandwidth is allocated sufficiently to all the destination ports (ports A, B, and C in FIG. 8).

It is also assumed that, concerning determination as to the presence of packets, high-priority class multicast packets (PACKET i and PACKET ii in Mul-H class) are cumulated in packet buffer 30, designating destination ports A, B, and C. It is further assumed that a large number of unicast packets of highest priority class (Uni-H class) have been input to a certain port (for example, Port A) among the designated designation ports A, B, and C. Symbols mc1 and mc2 illustrated in FIG. 7 correspond to PACKET i and PACKET ii, respectively.

Figures 1A, 1B:
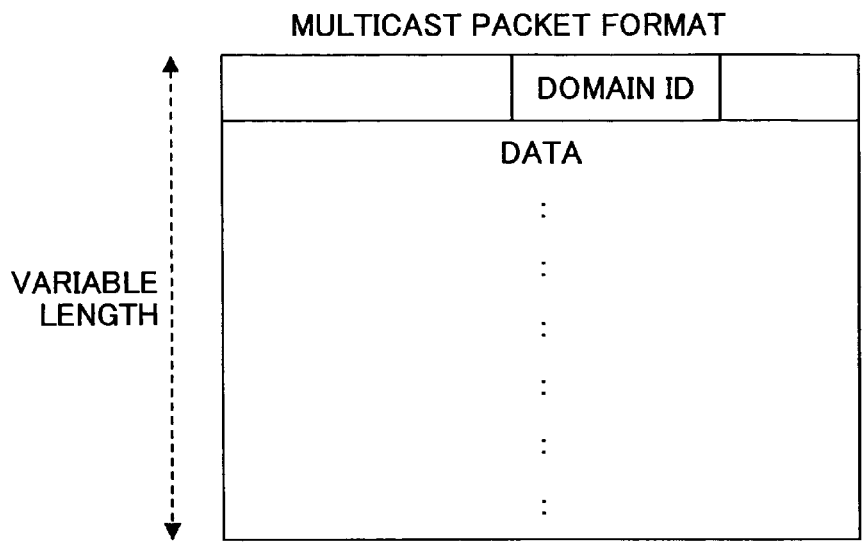
FIG. 1A and FIG. 1B are schematic diagrams illustrating a multicast packet format and a domain group table, respectively.
Figure 2:
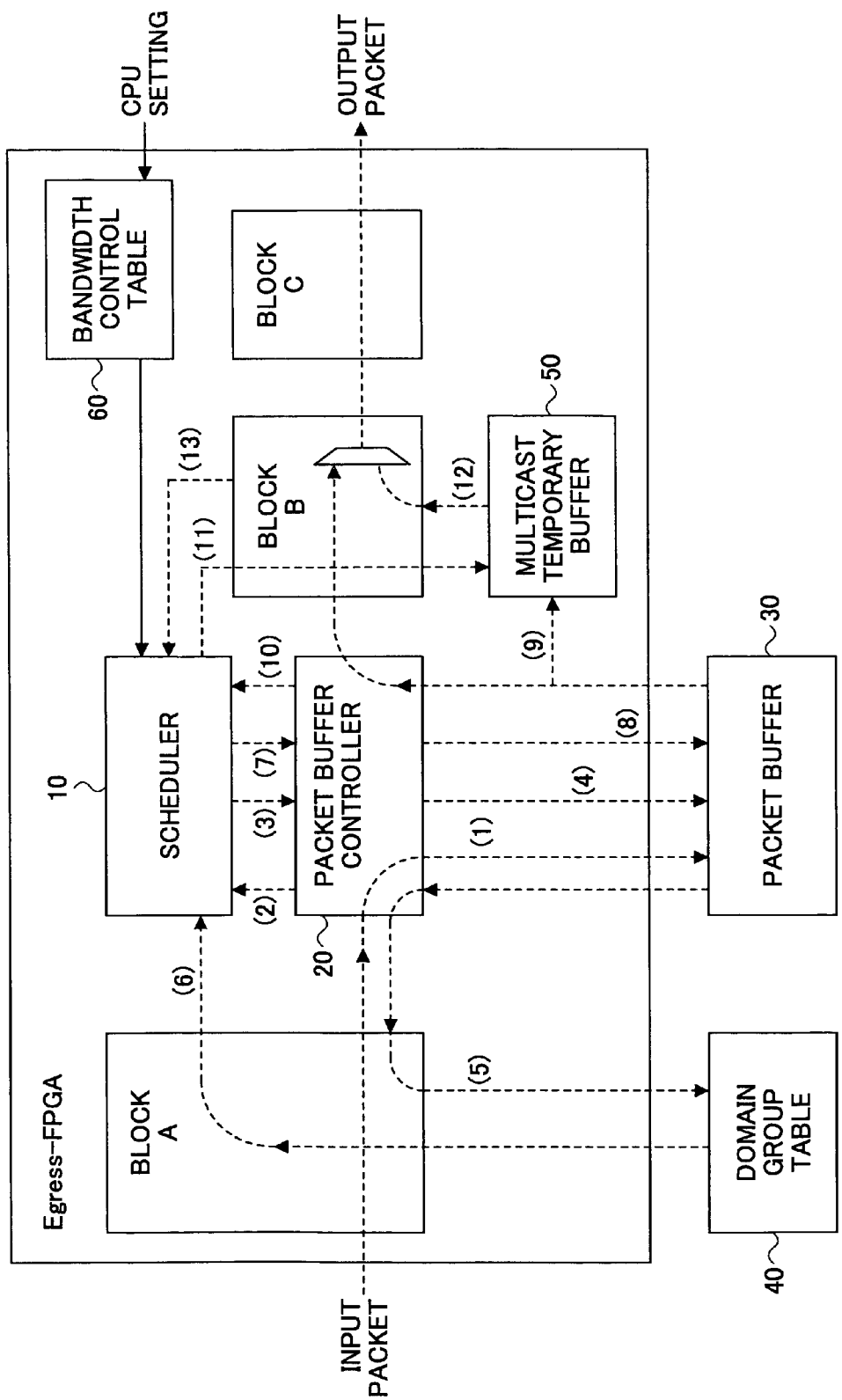
FIG. 2 is a functional block diagram of a conventional multicast packet readout control apparatus.
Figure 3:
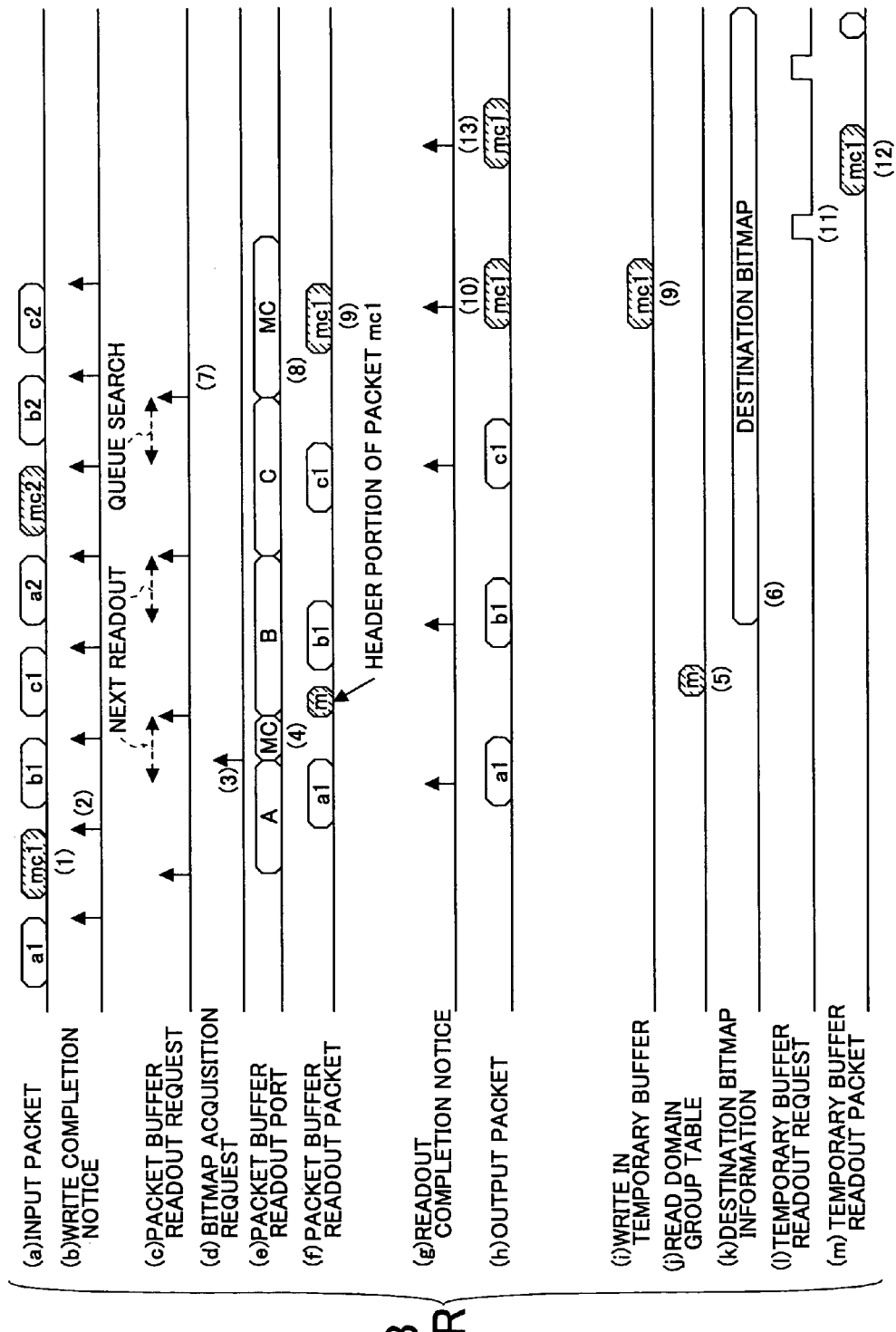
FIG. 3 is a time chart of the conventional multicast packet readout control procedure.

Under these circumstances, multicast packet readout control is performed as follows in an embodiment of the invention. The same steps as those of the conventional technique shown in FIG. 2 and FIG. 3 are denoted by the same numbers symbols. New steps different from the conventional technique are denoted by dashed numbers.

(1) Input multicast packets (PACKET i and subsequent PACKET ii) are stored in mutlpacket queues of the packet buffer 30. At this time, unicast packets of the highest priority class for destination port A are also stored in unicast queues of the packet buffer 30.

(2) The scheduler 10 is informed of the writing of multicast packet (PACKET i) in the packet buffer 30.

(3)' The scheduler 10 outputs a multicast readout request to the packet buffer controller 20.

(4)' The packet buffer controller 20 reads the multicast packet (PACKET i) from the packet buffer 30 and transfer this multicast packet to the multicast temporary buffer 50. The multicast packet is transmitted little by little from the packet buffer 30 to the multicast temporary buffer 50 making use of a time gap between unicast reading periods. This is illustrated along the time axis (f) in FIG. 7. The multicast packet m1 is divided into two portions mc1-1 and mc1-2, which portions are read between reading periods for unicast packets b1 and c1, and between reading period for unicast packets c1 and a1, respectively.

(5) The multicast destination bitmap for PACKET i is acquired from the domain group table 40 based on the domain ID information contained in the header portion of the multicast packet.

(6) The multicast destination bitmap acquired from the domain group table 40 is transmitted to the scheduler 10.

(7)' The scheduler 10 acquires all the destinations from the bitmap, while the multicast packet (PACKET i) is being transferred from the packet buffer 30 to the multicast temporary buffer 50. Then, the scheduler 10 outputs a readout request for reading the multicast packet from the multicast temporary buffer 50, converts the multicast packet into a unicast packet addressed to each of the destinations, and writes the converted unicast packet in the unicast queue of the associated class of the associated port (for example, the unicast queue for destination port A)) of the packet buffer 30, for each of the destinations. The writing (or copy) the converted unicast packet is carried out one by one in numerical order for all the destinations with a bit "1" set in the multicast destination bitmap. When the copy for port A has been completed, the bit "1" set for the destination port A is cleared from the destination bitmap. The remaining destinations are ports B and C. In background of these processes, a unicast packet is being read from the packet buffer 30.

(8)' For example, the multicast packet (PACKET i) read from the multicast temporary buffer 50 is converted to a unicast for destination port A, and written in the packet buffer 30 via the selector 82.

(9)' A readout/writing completion notice is supplied to the scheduler 10. This notice indicates that the multicast packet (PACKET i addressed to detination port A) has been read out as a unicast packet and written in the packet buffer 30.

(10)' Upon receiving the notice, the scheduler 10 outputs a request for reading the multicast packet from the multicast temporary buffer 50, converts the multicast packet into a unicast packet for the next destination port, and writes (or copies) the converted unicast packet in the associated unicast queue (for example, the unicast queue for destination port B) of the associated class of the packet buffer 30. After the copy of the packet, the bit "1" for the destination port B is cleared from the destination bitmap. Then, the remaining destination is port C.

(11)' The above-described steps (8)' through (10)' are repeated for all the remaining destinations with a bit "1" until the multicast packet (PACKET i) is copied into the unicast queues for all the destination ports defined in the multicast destination bitmap. After the copy process of all the destinations, the next multicast packet (PACKET ii) is read from the packet buffer 30, and subjected to the same process.

Prior to converting the multicast packet (PACKET i) read from the multicast temporary buffer 50 to a unicast packet, the associated destination is acquired. To be more precise, upon storing the multicast packet in the multicast temporary buffer 50, the associated destination is acquired, and the multicast packet is read from the multicast temporary buffer 50, and at the same time, it is converted to a unicast packet addressed to the associated designation and written in the unicast queue of the destination port in packet buffer 30. When writing of the current unicast packet converted from multicast packet (PACKET i) is completed, the next multicast packet (PACKET ii) is processed.

This arrangement can prevent multicast packets from being delayed in the multicast temporary buffer for long time. Even if the packet is blocked from being transmitted from the destination port A, such packet blocking is closed within the unicast queue of a specific destination port (for example, port A), and other ports are not influenced. The next multicast packet (PACKET ii) is supplied to an unoccupied destination port (such as port B or C) ahead.

The reading of the multicast packet from the multicast queue of the packet buffer 30 into the multicast temporary buffer 50 is performed regardless of the availability of output bandwidth or the class priority judging (SP) control. Consequently, even if a unicast packet of the highest priority class exists, the multicast packet is stored in the multicast temporary buffer 50 for a very short time, and converted into a unicast packet, which is then copied into the unicast queues of the associated destination ports, independent of the availability of output bandwidth or class priority judging (SP) control.

The multicast packet is read from the packet buffer 30 bit by bit, making use of the time gap between unicast reading periods when the reading request is generated. This is because the packet buffer reading time (time axis (f) shown in FIG. 7) is shorter than the packet buffer readout port selecting time (time axis (e) shown in FIG. 7) required in scheduling, and therefore a time gap is inevitably generated between packet buffer reading periods. Making use of this time gap, the multicast packet is read from the packet buffer 30 into the multicast temporary buffer 50.

Figure 7:
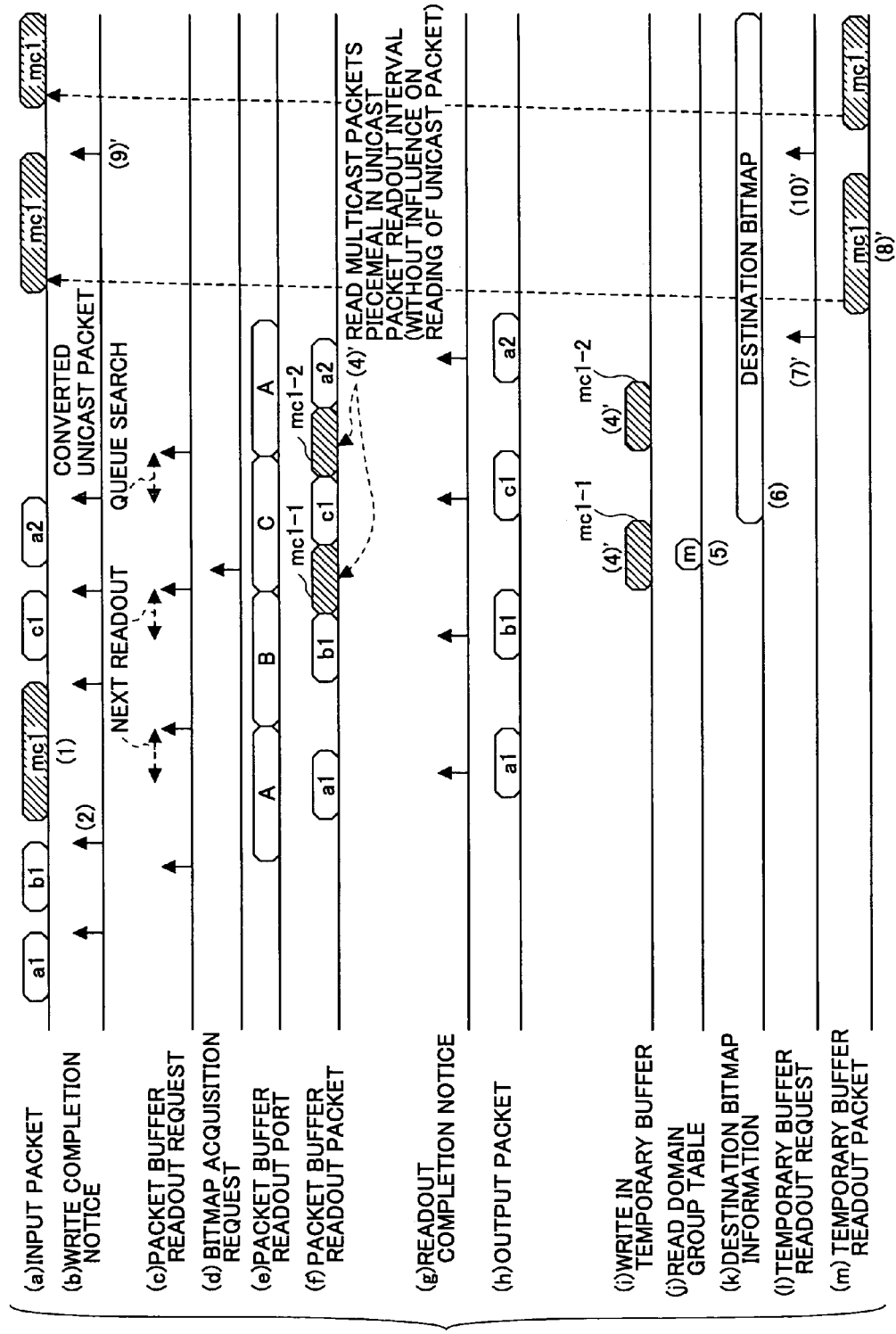
FIG. 7 is a time chart of the multipacket readout control procedure according to an embodiment of the invention.
Figure 8:
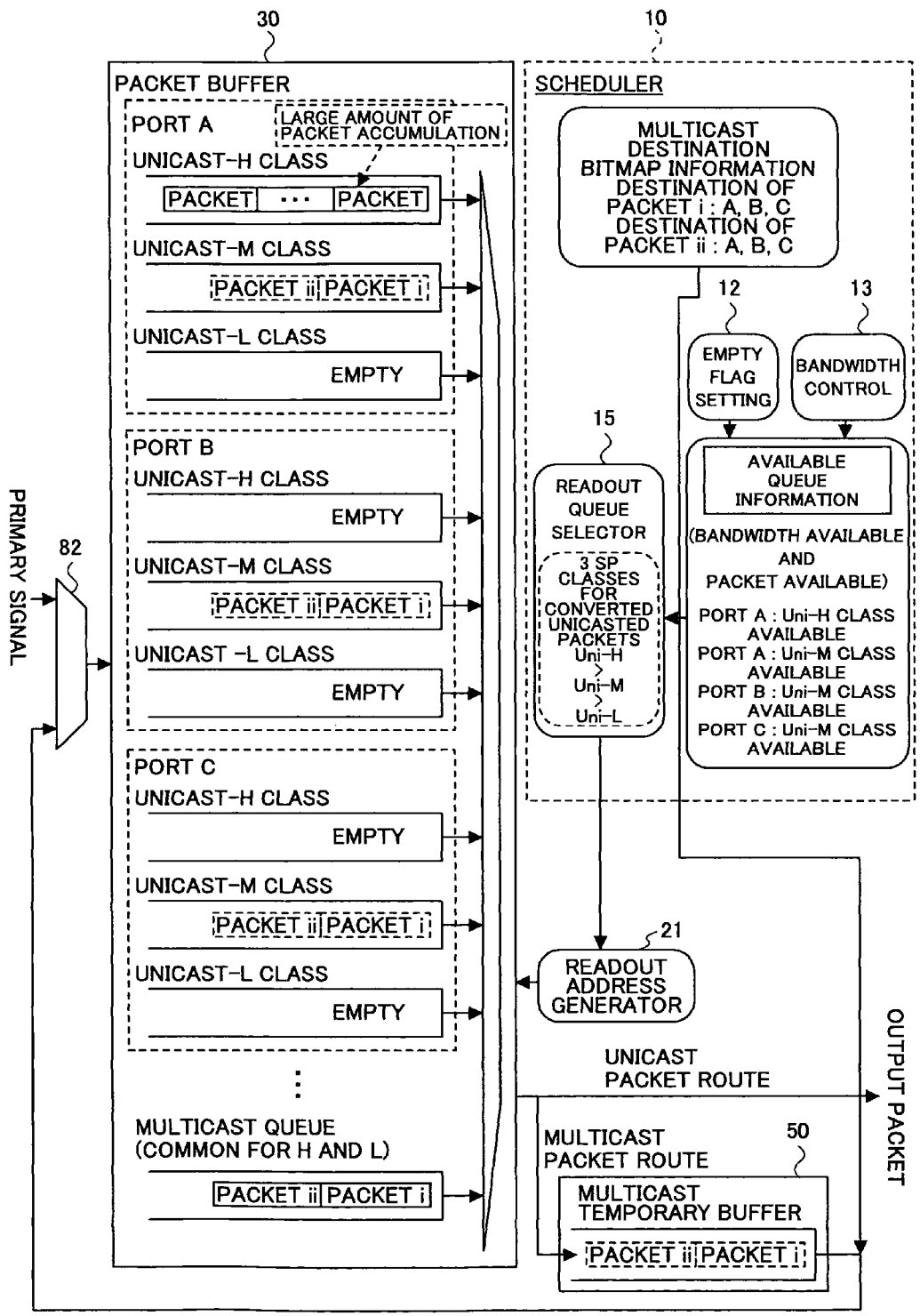
FIG. 8 is a detailed functional diagram of the multipacket readout control apparatus according to an embodiment of the invention.

In the example shown on the time axis (f) in FIG. 7, the multicast packet mc1 is divided into two portions mc1-1 and mc1-2. The multicast packet portion mc1-1 is read between reading periods of unicast packets b1 and c1, and the multicast packet portion mc1-2 is read between reading period of unicast packets c1 and a2. With this arrangement, the multicast packet can be read from the packet buffer 30, regardless of the packet length, without affecting the readout operation of the unicast packets (that is, without causing a delay in transmission of unicast packets).

Figure 9:
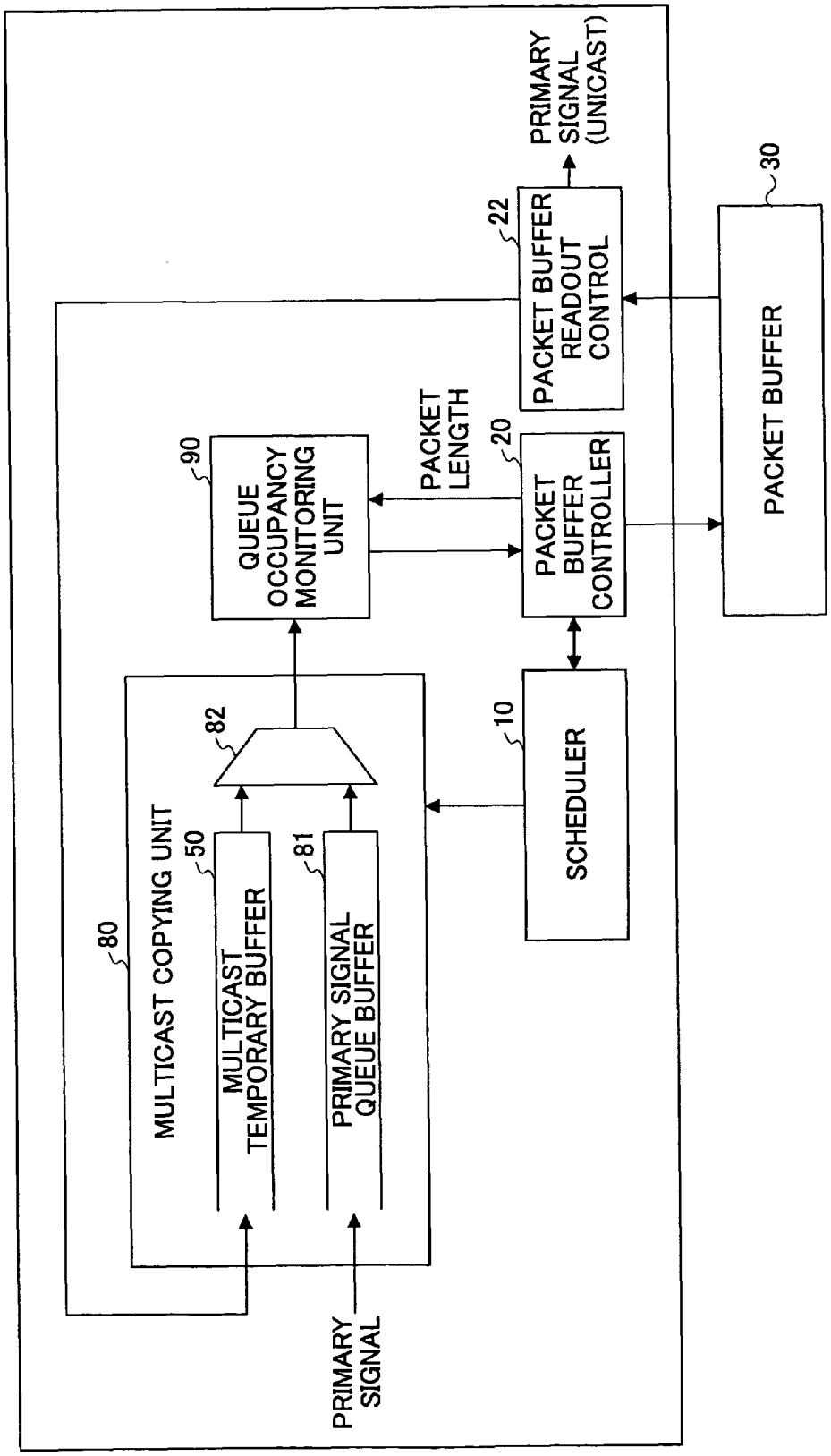
FIG. 9 is a block diagram illustrating the multicast copying unit and the queue occupancy monitoring unit according to an embodiment of the invention.

Next, consideration is made of the packet discard process occurring when the occupancy of the multicast queue exceeds the upper limit. This issue is explained with reference to FIG. 9, FIG. 10, and FIG. 11, in conjunction with a multicast copying unit 80 and a queue occupancy monitoring unit 90 according to an embodiment of the invention. In FIG. 9, the multicast copying unit 80 includes a multicast temporary buffer 50, a primary signal queue buffer 81, and a selector 82. The selector 82 selects either one of the input packet of a primary signal and a converted unicast packet which is output from the multicast temporary buffer 50 and converted to a unicast packet. The selected packet is supplied to the queue occupancy unit 90, prior to being sent to the packet buffer 30.

The input primary signal is temporarily stored in the primary signal queue buffer 81 of the multicast copying unit 80. The primary signal is immediately output from the queue buffer 81 unless it is the reading period of the multicast temporary buffer 50. If it is the reading period of the multicast temporary buffer 50, the primary signal is read from the primary signal queue buffer 81 after the completion of the reading operation from the multicast temporary buffer 50.

If the primary signal queue buffer 81 is occupied, the reading operation from the multicast temporary buffer 50 is suspended until the primary signal queue buffer 81 becomes empty. During the packet reading from the multicast temporary buffer 50, the input packet of the primary signal is held in the primary signal queue buffer 81, without being output. In order to prevent the primary signal input packet from being discarded due to overflow of the primary signal queue buffer 81, priority is given to reading from the primary signal queue buffer 81, rather than reading from the multicast temporary buffer 50.

Figure 10:
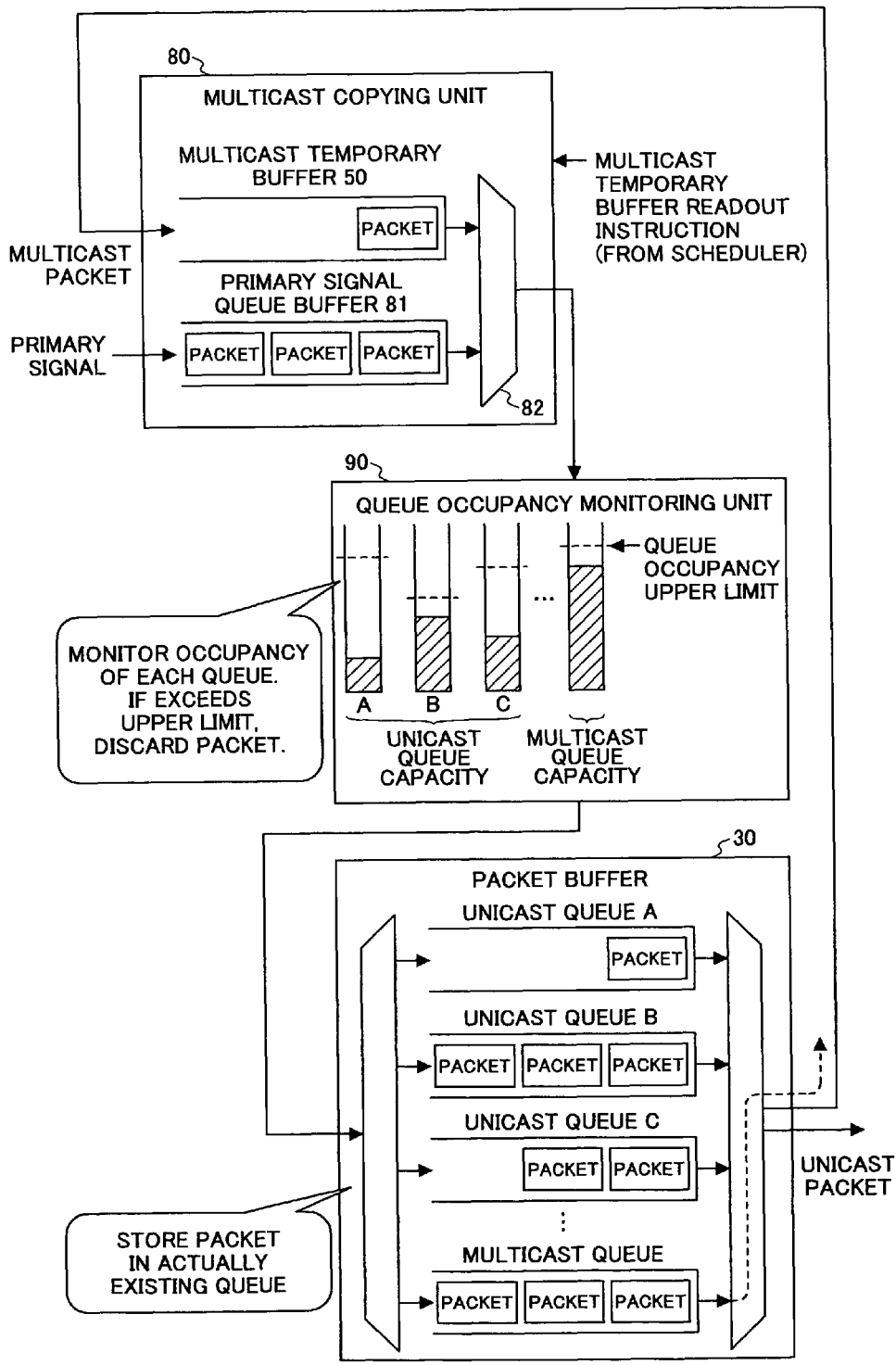
FIG. 10 is a schematic diagram illustrating the occupancy of each queue monitored in the queue occupancy monitoring unit.

As illustrated in FIG. 10, the queue occupancy monitoring unit 90 monitors the occupancy of each of the queues (including unicast queues for destination ports A, B, and C, and a multicast queue) of packet buffer 30. When a packet is written in the packet buffer 30, the queue occupancy monitoring unit 90 adds the value representing the packet length to the current queue occupancy. When a packet is read out of the packet buffer 30, the queue occupancy monitoring unit 90 subtracts the value representing the packet length from the queue current occupancy. An upper limit or an acceptable range is set in each queue. Upon receiving a packet, the queue occupancy monitoring unit 90 estimates whether the queue occupancy will exceed the upper limit if the newly arrived packet is written in the packet buffer 30. If over the upper limit or the acceptable range, then the queue occupancy monitoring unit 90 discards the packet, without writing in the packet buffer 30.

Since priority is given to reading from the primary signal queue buffer 81, rather than reading from the multicast temporary buffer 50, the multicast packet cannot be read from the multicast temporary buffer 50 if primary signal packets are input at a high rate. (See balloon <1> in FIG. 11).

Figure 11:
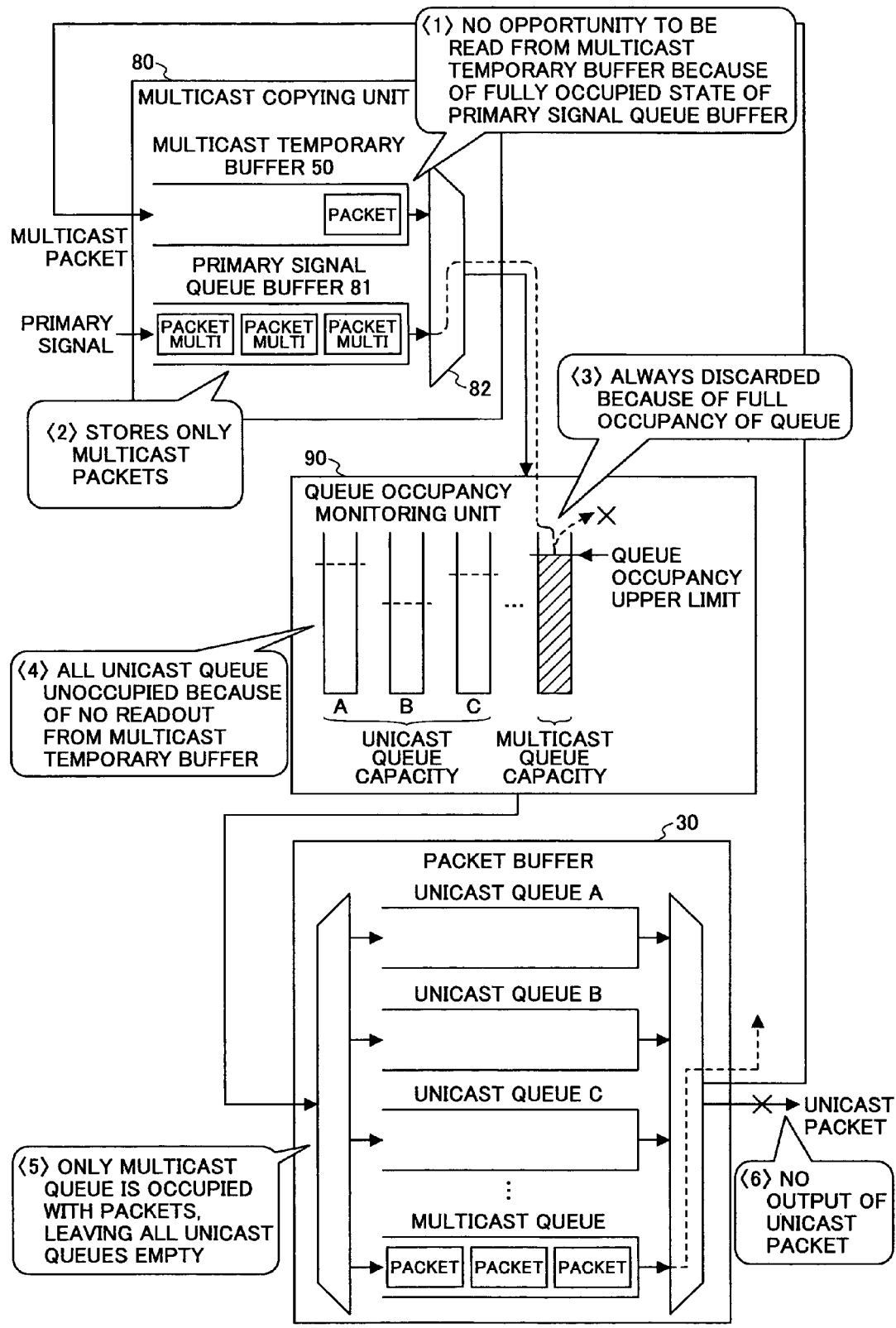
FIG. 11 is a schematic diagram illustrating delay of multicast packets occurring when the multicast queue occupancy exceeds the upper limit.

If most of the input primary signals are multicast packets, then multicast packets are always delayed in the primary signal queue buffer 81, as illustrated in balloon <2> in FIG. 11. This results in discard of multicast packets due to overflow of the queue (balloon <3> in FIG. 11). The discard process is carried out by the queue occupancy monitoring unit 90. Input multicast packets are continuously put into the primary signal queue buffer 81 at a high rate, blocking the multicast packet from being read from the multicast temporary buffer 50.

In such a situation, the multicast packet stored in the multicast temporary buffer 50 cannot be converted to a unicast packet, and therefore, the unicast queues in the packet buffer 30 are always empty, as illustrated in balloons <4> and <5> in FIG. 11. External output of unicast packets will not occur (balloon <6> in FIG. 11).

To avoid this problem, if overflow (packet accumulation over the upper limit) of the multicast queue occurs, the multicast copying unit 80 discards primary signal multicast packets, without writing the multicast packets into the primary signal queue buffer 81. In other words, the packet discard operation is carried out not only by the queue occupancy monitoring unit 90, but also by the multicast copying unit 80.

Figure 12:
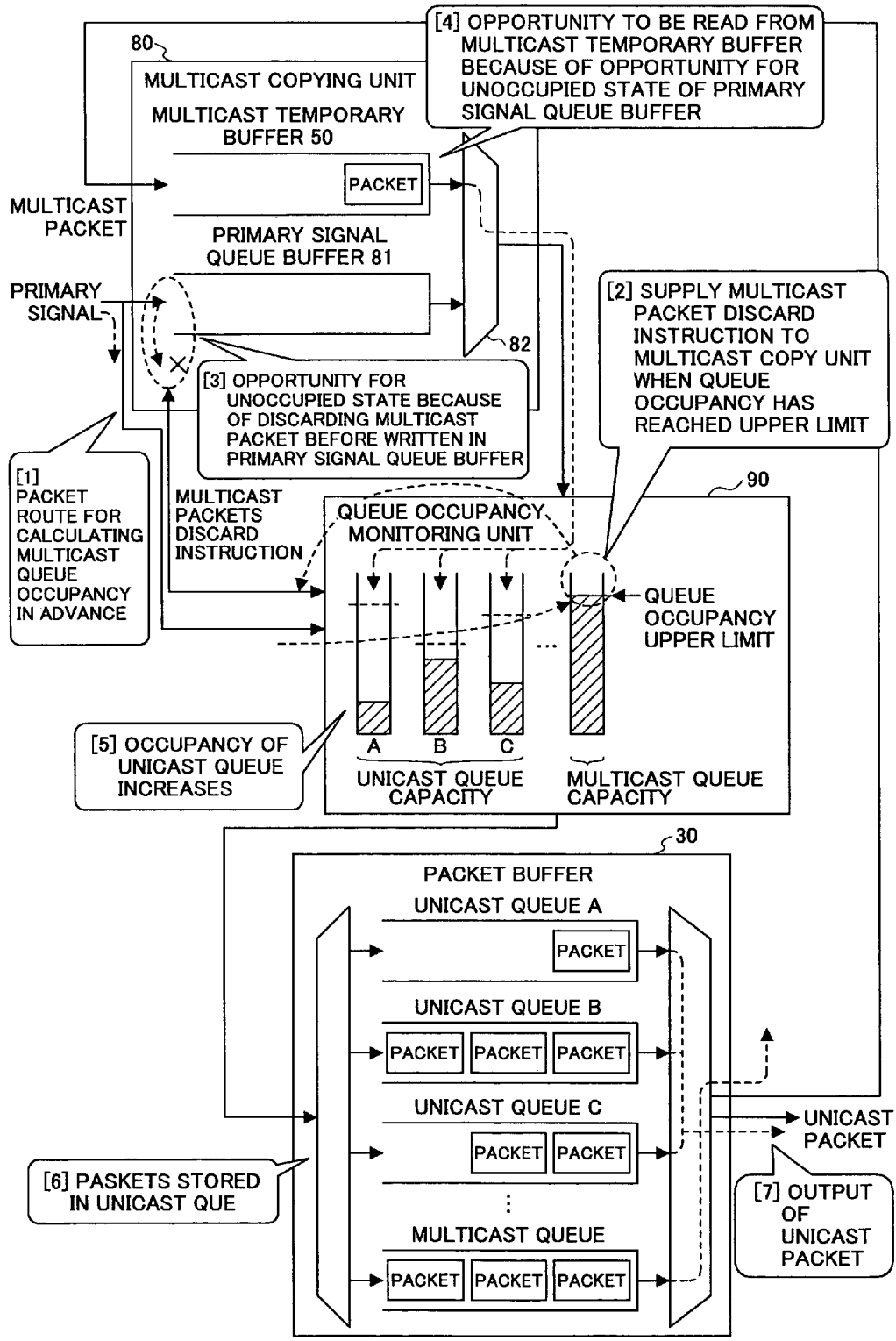
FIG. 12 is a schematic diagram illustrating the operations carried out when the multicast queue occupancy exceeds the upper limit to solve the conventional problem according to an embodiment of the invention.

FIG. 12 illustrates the packet discard operation carried out by the multicast copying unit 80. When a new primary signal packet is input to the multicast copying unit 80, a route for supplying this input packet to the queue occupancy monitoring unit 90 is provided, as illustrated by balloon [1] in FIG. 12. The primary signal packet is input to both the multicast copying unit 80 and the queue occupancy monitoring unit 90. The multicast copying unit 80 starts writing the input packet in the primary signal queue buffer 81, and simultaneously, the queue occupancy monitoring unit 90 calculates the expected occupancy of the multicast queue. If the calculation result exhibits the overflow of the multicast queue, the queue monitoring unit 90 supplies an instruction to the multicast copying unit 80 to discard the multicast packet currently written in the primary signal queue buffer 81, as illustrated by balloon [2] in FIG. 12.

In response to the instruction, the multicast copying unit 80 discards the multicast packet being written in the primary signal queue buffer 81. Meanwhile, those multicast packets having been accumulated in the primary signal queue buffer 81 are successively read into the queue occupancy monitoring unit 90 and discarded. Accordingly, there is an opportunity for the packets in the multicast temporary buffer 50 to be read when the primary signal queue buffer 81 becomes empty, as illustrated in balloons [3] and [4] in FIG. 12. The multicast packet read from the multicast temporary buffer 50 is converted to a unicast packet and stored in the associated unicast queue of the packet buffer 30, as illustrated balloon [5] and [6] in FIG. 12. Consequently, unicast packets are output externally, as illustrated in balloon [7] in FIG. 12.

As has been described above, the multicast packet read from the multicast queue is converted to a unicast packet addressed to each of the destinations, and the converted unicast packet is stored in the associated unicast queue of the associated port in the packet buffer. The converted (and copied) packets are read from the unicast queues and transmitted to the destinations. From a destination port allocated with sufficient output bandwidth, unicast packets are successively read and transmitted to the destination. At a destination port with insufficient output bandwidth, the unicast packets are delayed in the unicast queue, but this delay is closed in this unicast queue, without blocking other unicast packets addressed to the other destinations.

The configuration of the present invention does not cause long delay of multicast packets, and accordingly, packet loss is prevented. In addition, the timeout operation using a multicast packet discard timer is eliminated, and the circuit scale can be reduced. Unlike the conventional technique that has to perform multicast packet transmission scheduling and unicast packet transmission scheduling, the multicast packet readout control technique of the present invention performs scheduling only for unicast queues. The circuit structure and the process can be simplified.

By reading a portion or all of a multicast packet from a multicast queue in time gap between unicast packet reading periods, the multicast packet can be read reliably, regardless of the packet length. The multicast packet is converted to a unicast packet upon reading of that multicast packet, without adversely affecting reading of unicast packets. Consequently, packet delay can be prevented.

Because the priority class of the multicast packet is converted to that of a unicast packet, class priority judging control is performed only for unicast packets. Thus, the class priority control process can be simplified.

Upon exceeding the upper limit of queue occupancy, multicast packets of input primary signals are discarded, without inputting them in the primary signal queue buffer, while already stored multicast packets are discarded when they are read out of the primary signal queue buffer. This arrangement allows multicast packets to be read from the multicast temporary buffer by letting the primary signal queue buffer be in the unoccupied state, and prompt transmission of multicast packets can be realized with little delay.

This patent application is based on and claims the benefit of the earlier filing date of Japanese Patent Application No. 2004-079765 filed Mar. 19, 2004, the entire contents of which are incorporated herein by reference.

What is claimed is:

1. A multicast packet readout control method comprising the steps of:
   providing a packet buffer having a multicast queue and a unicast queue;
   temporarily storing an input multicast packet in the multicast queue of the packet buffer;
   reading the multicast packet from the multicast queue of the packet buffer and transferring the readout multicast packet to a temporary buffer;
   converting the multicast packet read out of the temporary buffer to a unicast packet addressed to each of a plurality of destinations of the multicast packet;
   supplying the converted unicast packet back to the packet buffer via a selector and storing the converted unicast packet in the unicast queue of the packet buffer having the multicast queue and the unicast queue; and
   reading the converted unicast packet from the unicast queue and transmitting the unicast packet to the destination.

2. The method of claim 1, wherein a portion or the entirety of the multicast packet is read from the multicast queue of the packet buffer in a time gap between unicast packet reading periods.

3. The method of claim 1, further comprising the steps of:
   monitoring occupancy of the multicast queue of the packet buffer; and
   discarding a newly input multicast packet of a primary signal, without storing the new multicast packet in a primary signal queue buffer, if the occupancy of the multicast queue exceeds a prescribed level.

4. A multicast packet readout control apparatus comprising:
   a packet buffer having a multicast queue and a unicast queue and configured to temporarily store an input multicast packet in the multicast queue;
   a temporary buffer configured to store the multicast packet transferred from the multicast queue;
   packet conversion means configured to read the multicast packet from the temporary buffer, convert the multicast packet to a unicast packet addressed to each of a plurality of destinations of the multicast packet, supply the converted unicast packet back to the packet buffer via a selector, and store the converted unicast packet in the unicast queue of the packet buffer having the multicast queue and the unicast queue; and
   reading and transmitting means configured to read the converted unicast packet from the unicast queue and transmit the converted unicast packet to the destination.

5. The apparatus of claim 4, wherein the packet conversion means is configured to read the multicast packet from the multicast queue in a time gap between unicast packet reading periods.

6. The apparatus of claim 4, wherein the packet conversion means is configured to convert a priority class of the multicast packet into a priority class of the unicast packet.

7. The apparatus of claim 4, further comprising:
   a primary signal queue buffer configured to store the input multicast packet of a primary signal before the input multicast packet is stored in the packet buffer; and
   a selector configured to output either one of the multicast packet from the temporary buffer and the input multicast packet of the primary signal from the primary signal queue buffer.

8. The apparatus of claim 7, further comprising:
   a queue occupancy monitoring unit configured to receive monitor occupancy of the multicast queue and discard the multicast packet output from the selector when the monitored occupancy exceeds a prescribed level.

9. The apparatus of claim 8, wherein the queue occupancy monitoring unit is configured to instruct the primary signal queue buffer to discard the newly input multicast packet when the monitored occupancy exceeds the prescribed level.

10. A multicast packet readout control method comprising the steps of:
    providing a packet buffer having a multicast queue and a unicast queue;
    temporarily storing an input multicast packet in the multicast queue of the packet buffer;
    reading the multicast packet from the multicast queue of the packet buffer and transferring the multicast packet to a temporary buffer;
    converting the multicast packet read out of the temporary buffer to a unicast packet addressed to each of a plurality of destinations of the multicast packet;
    supplying the converted unicast packet back to the packet buffer having the multicast queue and the unicast queue via a selector to store the converted unicast packet in the unicast queue of the packet buffer; and
    reading the converted unicast packet from the unicast queue and transmitting the unicast packet to the destination.

11. A multicast packet readout control apparatus comprising:
    a packet buffer having a multicast queue and a unicast queue and configured to temporarily store an input multicast packet in the multicast queue;
    a temporary buffer configured to store the multicast packet transferred from the multicast queue;
    packet conversion means configured to read the multicast packet from the temporary buffer, convert the multicast packet read out of the temporary buffer to a unicast packet addressed to each of a plurality of destinations of the multicast packet, and supply the converted unicast packet back to the packet buffer having the multicast queue and the unicast queue via a selector to store the converted unicast packet in the unicast queue of the packet buffer; and
    reading and transmitting means configured to read the converted unicast packet from the unicast queue and transmit the converted unicast packet to the destination.

* * * * *